United States Patent
Milicevic et al.

(10) Patent No.: US 8,904,827 B2
(45) Date of Patent: Dec. 9, 2014

(54) METHOD OF MANUFACTURING AN OPTICAL FIBRE, PREFORM AND OPTICAL FIBRE

(75) Inventors: Igor Milicevic, Helmond (NL); Mattheus Jacobus Nicolaas Van Stralen, Tilburg (NL); Johannes Antoon Hartsuiker, Eindhoven (NL); Eugen Aldea, Eindhoven (NL); Eric Aloysius Kuijpers, Eindhoven (NL)

(73) Assignee: Draka Comteq B.V., Amsterdam (NL)

( * ) Notice: Subject to any disclaimer, the term of this patent is extended or adjusted under 35 U.S.C. 154(b) by 292 days.

(21) Appl. No.: 13/428,420

(22) Filed: Mar. 23, 2012

(65) Prior Publication Data
US 2012/0240636 A1 Sep. 27, 2012

(30) Foreign Application Priority Data
Mar. 25, 2011 (NL) .................. 2006472

(51) Int. Cl.
*C03B 37/018* (2006.01)

(52) U.S. Cl.
CPC ....... *C03B 37/0183* (2013.01); *C03B 37/01815* (2013.01); *C03B 37/01823* (2013.01); *C03B 2201/31* (2013.01)
USPC ........................................ 65/417

(58) Field of Classification Search
CPC ............ C03B 37/018; C03B 37/01823; C03B 37/0183; C03B 37/01815
USPC ........................................ 65/417
See application file for complete search history.

(56) References Cited

U.S. PATENT DOCUMENTS

| | | | |
|---|---|---|---|
| 4,741,747 A | 5/1988 | Geittner et al. | |
| 4,857,091 A | 8/1989 | Geittner et al. | |
| 5,188,648 A | 2/1993 | Geittner et al. | |
| 5,318,612 A | 6/1994 | Le Noane et al. | |
| 5,397,372 A | 3/1995 | Partus et al. | |
| 7,519,256 B2 | 4/2009 | Terpsma et al. | |
| 7,522,800 B2 | 4/2009 | Milicevic et al. | |
| 2003/0172681 A1* | 9/2003 | Guskov et al. | 65/391 |
| 2005/0000253 A1* | 1/2005 | Xie et al. | 65/417 |
| 2005/0041943 A1 | 2/2005 | Milicevic et al. | |
| 2008/0044150 A1* | 2/2008 | Terpsma et al. | 385/126 |
| 2008/0295541 A1 | 12/2008 | Otosaka | |
| 2009/0003787 A1* | 1/2009 | Hartsuiker et al. | 385/124 |

FOREIGN PATENT DOCUMENTS

| | | |
|---|---|---|
| EP | 0038982 A2 | 10/1981 |
| EP | 0333580 A1 | 9/1989 |
| GB | 2118165 A | 4/1982 |

OTHER PUBLICATIONS

International Search Report NL 2006472 dated Dec. 5, 2011.

* cited by examiner

*Primary Examiner* — Queenie Dehghan
(74) *Attorney, Agent, or Firm* — Shumaker, Loop & Kendrick, LLP

(57) ABSTRACT

A method for manufacturing an optical preform via an internal vapor deposition process, wherein during the inside deposition process the velocity of the reaction zone is set so that the velocity of the reaction zone over the length of the supply side-to-discharge side is higher than the velocity of the reaction zone over the length of the discharge side-to-supply side.

11 Claims, 2 Drawing Sheets

METHOD OF MANUFACTURING AN OPTICAL FIBRE, PREFORM AND OPTICAL FIBRE

CROSS-REFERENCE TO RELATED APPLICATION

This application claims priority to Dutch Patent Application No. 2006472 filed Mar. 25, 2011, the contents of which are incorporated by reference herein.

TECHNICAL FIELD AND BACKGROUND OF THE INVENTION

The present invention relates to a method of manufacturing an optical fibre including the following steps:
 i) providing a hollow substrate tube,
 ii) passing doped or undoped reactive, glass-forming gases through the interior of the hollow substrate tube,
 iii) creating such conditions in the interior of the hollow substrate tube that deposition of glass layers onto the interior of the hollow substrate tube takes place, wherein a non-isothermal plasma is reciprocated between two reversal points along the substrate tube, wherein the velocity of movement of the plasma decreases to zero from each deceleration point to each reversal point,
 iv) subjecting the substrate tube thus obtained to a collapsing treatment so as to form a solid preform, and
 v) drawing an optical fibre from the solid preform.

In addition to that, the present invention relates to a preform for manufacturing an optical fibre, as well as to an optical fibre.

Such a method is known per se from U.S. Pat. No. 7,522,800 in the name of the present applicant.

US 2008/0295541 relates to a method of manufacturing an optical fiber preform using a high frequency induction thermal plasma.

U.S. Pat. No. 5,318,612 relates to a method for producing a preform for optical fibers, comprising the steps of thermic glazing of internal and external surfaces of the bar, depositing a vitreous coating on the internal surface of the bar, said vitreous coating being provided for the subsequent formation of a core of the optical fibers, and collapsing the bar, various temperatures of the bar required for the glazing, depositing, and collapsing steps being obtained by varying the temperature of the oven.

Using the present invention, preforms for optical fibres are produced by means of an internal chemical vapour deposition technique (CVD), which process involves the deposition of doped or undoped reactive, glass-forming gases on the inside of a hollow substrate tube. Such reactive gases are supplied on one side of the substrate tube, viz. the entrance side, forming a glass layer on the interior of the substrate tube under the influence of special process conditions. A reaction zone is reciprocated along the substrate tube so as to form a glass layer. The reaction zone, in particular a plasma generator, supplies high-frequency energy, as a result of which a plasma is generated in the interior of the substrate tube, under which plasma conditions the reactive, glass-forming gases will react (the plasma CVD technique). It is also possible, however to supply the energy by means of heat, in particular by using burners, on the outer side of the substrate tube or via a furnace that surrounds the substrate tube. A common feature of the aforesaid techniques is the fact that the reaction zone is reciprocated with respect to the substrate tube.

According to a Plasma Chemical Vapor Deposition (PCVD) process the quartz substrate tube is placed in a resonant cavity along its cylindrical axis, and a mixture of raw material gases containing for example, $O_2$, $SiCl_4$, and one or more dopants, e.g. $GeCl_4$, $C2F6$ is passed into the tube; a local plasma is simultaneously produced within the resonant cavity, causing the reaction of Si, Ge, O, etc., thereby $SiO_x$ mainly doped with Ge/F is formed by direct deposition on the inside surface in the substrate tube, forming a core layer and one or more cladding layers. The hollow quartz glass substrate tube is surrounded by a furnace. During the internal deposition step the resonant cavity moves along the cylindrical axis of the substrate tube as to uniformly coat the whole length of the substrate tube with glass layers. When deposition is finished the substrate tube is collapsed into a solid core rod, which has a $SiO_2$ core layer doped with dopants like F, Ge and a surrounding $SiO_2$ cladding undoped or doped with F—Ge. Such a core rod is made into an optical fiber preform, for example by inserting into a jacket tube or by OVD overcladding, which can be drawn into optical fiber used as the transmission medium for communication.

High temperatures may lead to the inclusion of the undesirable OH groups in the external surface of the support tube. Since the support tube forms part of the fibre yet to be drawn, it is to be expected that said included OH groups will present problems as regards the optical properties of the glass fibre that is eventually obtained. The OH groups that are included on the outer side can diffuse inwardly, that is, in the direction of the core, in the course of the further processing steps, when temperatures are high. It has become apparent that said OH groups produce adverse effects in the light conducting part of the optical fibre. After all, the OH groups exhibit a wide absorption peak at 1385 nm. As a result, additional signal loss occurs in the optical glass fibre with the transmission wavelengths around 1300 nm and 1500 nm that are currently being used. Moreover, said absorption peak at 1385 nm limits the use of the fibre over a large wavelength range that recent developments require. Thus it is desirable that the effect of the inwardly diffusing OH groups is minimized, thus minimizing the signal loss at the standard transmission wavelengths, which makes the fibre very suitable from a commercial point of view.

A method for making a preform which is substantially free of OH impurities is known from U.S. Pat. No. 5,397,372.

US 2005/0000253 relates to a method for manufacturing low water peak single mode optical fibers by PCVD technology, wherein the attenuation of the single mode optical fiber produced thereby at 1383 nm being lower than the specified value at 1310 nm. Said US patent application focuses on the content of impurities in the gas mixture, the hydroxyl content of the jacket tube and the relative humidity of the environment during the deposition process.

U.S. Pat. No. 7,519,256 relates to a method for manufacturing an optical preform wherein the velocity of the reaction zone for the deposition of the inner cladding is set so that the acceleration of the reaction zone near the point of reversal at the supply side for depositing the inner cladding is higher than the acceleration of the reaction zone near the point of reversal at the supply side for depositing the outer cladding.

U.S. Pat. No. 4,741,747 relates to a method of manufacturing optical fibres, wherein the so-called end taper is reduced by moving the plasma nonlinearly as a function of time in the region of the reversal point and/or by varying the intensity of the plasma along the length the glass tube.

U.S. Pat. No. 4,857,091 relates to a method of manufacturing optical fibres, in which a number of parameters are mentioned that influence the axial position of the local deposition zone with respect to the plasma generator, which parameters include:

(i) periodically varying the microwave power,
(ii) periodically varying the pressure in the substrate tube, and
(iii) periodically varying the stroke velocity of the resonator being reciprocated over the tube.

European patent application No. 0 038 982 relates to a method of manufacturing optical fibres wherein the plasma generator is moved along the substrate tube, which plasma generator produces a hot zone such that the hot zone can be considered as a so-called "tandem hot zone" which includes at least two zones, viz. zone I and zone II. Although it is mentioned in said document that deposition rates or deposition compositions can be changed so as to prevent the occurrence of so-called taper ends, it is not indicated in said document what specific operations such a treatment involves.

European patent application No. 0 333 580 relates to a device for manufacturing preforms for optical fibres in which a variable power microwave generator is used, in which no use is made of a non-isothermal plasma which is reciprocated between two reversal points along the substrate tube, however.

From British patent publication GB 2 118 165 there is known a method of manufacturing an optical fibre in which the velocity of the heat source being moved axially along the substrate tube is in accordance with a specific mathematical equation, wherein the velocity of said heat source along the tube is a function of the position of said heat source along the substrate tube, so that the total deposition thickness of the glass layers is substantially constant over the length of the tube.

From U.S. Pat. No. 5,188,648 to the present applicants there is known a method of manufacturing optical fibres wherein the movement of the plasma is interrupted each time the plasma reaches the reversal point near the gas entry point of the substrate tube, whilst the glass deposition continues, wherein the period during which the plasma movement is interrupted is at least 0.1 second.

BRIEF SUMMARY OF THE INVENTION

An object of the present invention is thus to provide a method of manufacturing a preform from which an optical fibre can be drawn, which preform exhibits little geometric and optical taper.

Another aspect of the present invention is to provide a preform from which an optical fibre can be drawn, which preform exhibits optical properties which are constant over the greatest possible length.

Another aspect of the present invention is to provide a preform from which an optical fibre can be drawn, which optical fibre shows a reduced attenuation at a wavelength of 1383 nm.

The present invention as referred to in the preamble is characterized in that during the inside deposition process the velocity of the reaction zone is set so that the velocity of the reaction zone over the length supply side—discharge side is higher than the velocity of the reaction zone over the length discharge side—supply side.

One or more of the above objects are accomplished by using such a feature. The present inventors have thus found that the attenuation at a wavelength of 1385 nm in silica fibres can be reduced by using different sledge-velocity from gas- or supply-side to discharge or pump-side and pump-side to gas-side. The reaction zone is preferably a plasma and the resonator generating microwaves is movable over the length of the hollow quartz glass substrate tube.

The attenuation in silica fibres is generally a consequence of a combination of Rayleigh scattering, absorption and bending. The absorption is usually caused by a contaminant in the glass, in which water, especially OH-group, is usually the most dominant absorber in silica fibres. The inclusion of the OH-group in the glass layer causes a peak in the optical spectrum around a wavelength of 1250 nm and 1385 nm. The present inventors found that by using different sledge velocities a significant difference in OH attenuation can be attained. The present deposition method is preferably of the PCVD type. The PCVD method results in the direct formation of glass inside the quartz substrate tube whereas other processes result in the formation of soot, which material is to be vitrified in another step.

The present inventors realized that the negative effect of the so called OH peak on the attenuation can also be reduced by the incorporation dopants in the glass layers to be deposited, e.g. fluor. A drawback of incorporating fluor in the glass layers is the lowering of the refractive index value, which lowering is to be compensated by the incorporation of other types of dopants, e.g. germanium. A consequence of the incorporation of germanium in the glass layers is the Rayleigh scattering.

Therefore, the present invention does not focus on influencing the composition of the dopants in the glass forming gases entering the hollow quartz glass substrate tube for solving the attenuation problem of optical glass fibers, but the present invention is related to the use of different sledge-velocities over the length supply side—discharge side and over the length discharge side—supply side during the inside deposition process. The aspect of different sledge velocities does not necessarily apply during the complete deposition process. It is therefore possible to start the inside deposition process with a sledge velocity which is more or less the same for both lengths, due to equilibrium aspects of the process conditions inside the hollow substrate tube. And after a certain moment the sledge velocity is adapted according to the present invention. At the end of or even during the deposition process itself, if appropriate, it is possible to amend the sledge velocities in such a way that the sledge velocities are outside the present method.

In a preferred embodiment of the present invention the velocity of the reaction zone over the length discharge side—supply side is at most 70%, preferably at most 50%, more preferably at most 30% of the velocity of the reaction zone over the length supply side-discharge side.

The present inventors assume that the beginning position of the plasma is directly influenced by the direction of the movement of the reaction zone travelling along the length of the substrate tube. The present inventors assume that there is a longer plasma tail at the gas-side when moving the reaction zone from gas-side to pump-side. This phenomenon is caused by the fact that the plasma is already ionised in the gas-side region. In a situation in which the reaction zone moves further towards the pump-side, the gas-side plasma tail is easily sustained by the microwaves. On the other hand, when the reaction zone moves towards to the gas-side, the gas-side tail is short, in which the gas-side plasma front is pulled back close to, or even inside, the reaction zone. The present inventors assume that such a longer plasma tail at the gas side will have an influence on the intensity of the position where the deposition of the glass layer inside the substrate tube starts. And the present inventors assume that the intensity of the plasma front has a direct influence on the incorporation of the (O)H molecules in the quartz substrate tube. And such an incorporation of the (O)H molecules in the quartz substrate tube should be kept to a minimum.

In addition to the aforementioned proposed mechanism, the present inventors assume that the pump-side plasma tail, which contains a relatively high amount of chlorides, will purify the inner surface of the substrate tube. If the reaction zone moves towards the gas-side, the thus freshly deposited glass layers are treated. The present inventors assume that the layers deposited when the reaction zone moves towards the gas-side are expected to contain a lesser amount of (O)H than the layers deposited when the reaction zone moves towards the pump-side. Please note that the present inventors are not bound to the two afore discussed mechanisms.

In a preferred embodiment the velocity of the reaction zone over the length supply side—discharge side is within the range of 2 m/min-40 m/min, preferably 15 m/min-25 m/min. In case the velocity of the reaction zone is less than 2 m/min, the deposition efficiency of dopants tends to drop to a very low value, which is undesirable. The present inventors assume that a low velocity of the reaction zone the temperature inside the hollow substrate tube will be too high, resulting in a negative effect on the deposition efficiency of dopants. If the velocity of the reaction zone is above the aforementioned upper limit, several problems with the deposition apparatus will probably occur, especially in the area at the reversal points. The velocity of the reaction zone at each of the reversal points is zero which means that velocity should be reduced from a value of above 40 m/min to zero over a short distance. This will probably result in mechanical problems of the deposition apparatus.

In order to obtain a high deposition efficiency the present inventors found that the power output of the reaction zone is preferably constant over the length supply side—discharge side and the length discharge side—supply side.

In order to keep the deposition efficiency of dopants, especially $GeCl_4$, at an acceptable level it is preferred that the velocity of the reaction zone is above 2 m/min, preferably above 15 m/min.

During an embodiment according to the present inside deposition process the outer cladding is deposited first and then an inner cladding is deposited, in which embodiment it is preferred that during the inside deposition process the velocity of the reaction zone over the length discharge side—supply side is changed as function of the deposition time, in which the initial velocity is higher than the final velocity. This means that the overall thickness of the glass layers thus deposited will increase during the deposition process resulting in a reduction of the velocity of the reaction zone over the length discharge side—supply side.

The present method for manufacturing an optical fibre preform via an internal vapour deposition process is preferably of the plasma chemical vapour deposition (PCVD) type, in which process the reaction zone is a plasma, e.g. a resonator.

In the present description the velocity of the reaction zone is set so that the velocity of the reaction zone over the length supply side—discharge side is higher than the velocity of the reaction zone over the length discharge side—supply side. In that context one must realise that the velocity near the both points of reversal, i.e. the supply side point of reversal and the discharge side point of reversal, becomes zero. The term velocity as used in the present description, especially in the claims, refers to the average velocity over substantially the whole length of the quartz glass substrate tube, i.e. the velocity having a constant value or a certain slope, in which the velocity will be reduced to zero at both points of reversal. The velocity here means thus the velocity between the deceleration/acceleration point at the supply side and the deceleration/acceleration point at the discharge side. And that velocity over that specific distance can be constant but can be decreased or increased compared to the initial value at the beginning of that distance. Therefore, one can also speak about the average velocity.

In that aspect the present application completely differs from the U.S. Pat. No. 7,522,800 in the name of the present applicant, in which US patent the velocity profile is related to the first and second end regions, i.e. a region adjacent to a reversal point at the supply side and the discharge side, i.e. the region between the point in which the velocity is zero, i.e. the reversal point itself, and the point wherein the deceleration/acceleration of the reaction zone starts. The velocity in these specific regions can not be interpreted as being constant.

The present invention furthermore relates to a method for forming an optical fibre in which an optical preform, obtained according to the present method, is heated at one end, from which optical preform an optical fibre is subsequently drawn, in which the preform as manufactured according to the present method is used.

BRIEF DESCRIPTION OF THE DRAWINGS

The present invention will now be explained in more detail, by means of a number of examples, in which connection it should be noted, however, that the present invention is by no means limited to such special examples.

DETAILED DESCRIPTION OF THE INVENTION

Figure 1:
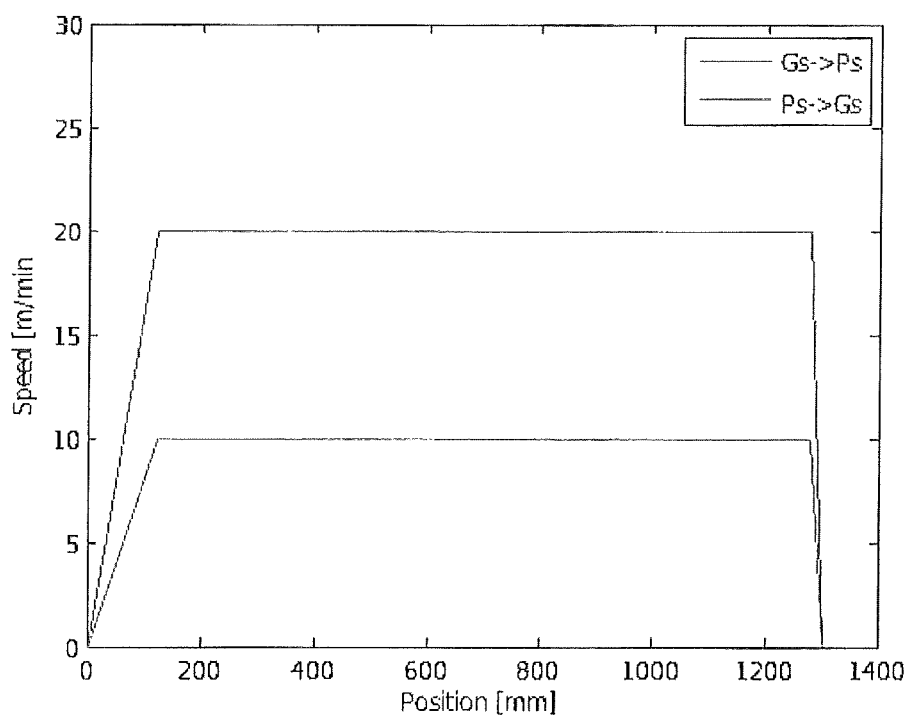
FIG. 1 shows a velocity profile of a sledge according to the present invention.

Using the PCVD technique a preform was produced. As shown in FIG. 1, the velocity profile of the reaction zone over the length of the supply side-to-discharge side is higher than the velocity of the reaction zone over the length of the discharge side-to-supply side. The substrate tube was surrounded by an oven and the reaction zone traveled over the length of substrate tube during the deposition process. The power of the reaction zone, i.e. microwave power, was 7000 Watt. The pressure inside the hollow substrate tube was approximately 14 mbar. The temperature of the oven was set between 1070 and 960 degrees Celsius. The composition of the gaseous components flowing in the hollow substrate tube was about ⅔ parts oxygen, ⅙ parts SiCl4 and between 0 and ⅙ parts GeCl4. The deposition process took about 620 minutes. In fact, according to the embodiment disclosed in FIG. 1, the velocity of the reaction zone from gas-side to pump-side was set at a constant value of 20 m/min, whereas the velocity of the reaction zone over the length pump-side-gas-side was set at a velocity of 10 m/min, i.e. a reduction of 50%. FIG. 1 clearly discloses the reversal points near the supply side (at the left hand side of the figure) and the discharge side (at the right hand side of the figure) in which the constant velocity will be reduced to zero at each reversal point. The point where the velocity drops to zero is called the deceleration point. As can be seen in FIG. 1, the deceleration point at the supply side is located at a position between 0 (reversal point) and about 200 mm, the deceleration point at the discharge side is located at a position between 1200 and 1400 mm. The term "velocity" as used in the present description refers to the velocity between these two deceleration points, i.e. the region where the velocity of the resonator is constant over a certain length of the substrate tube. In the embodiment according to FIG. 1 the velocity of the reaction zone was kept constant over both lengths during the complete deposition process. However, in a special embodiment it is possible to initially start the inner deposition process with the same velocity profile for both lengths and to adapt after a certain deposition time the velocity of the reaction zone by reducing the velocity over the length of the discharge side-to-supply side compared to the velocity over the length of the supply side-to-discharge side.

Figure 2:
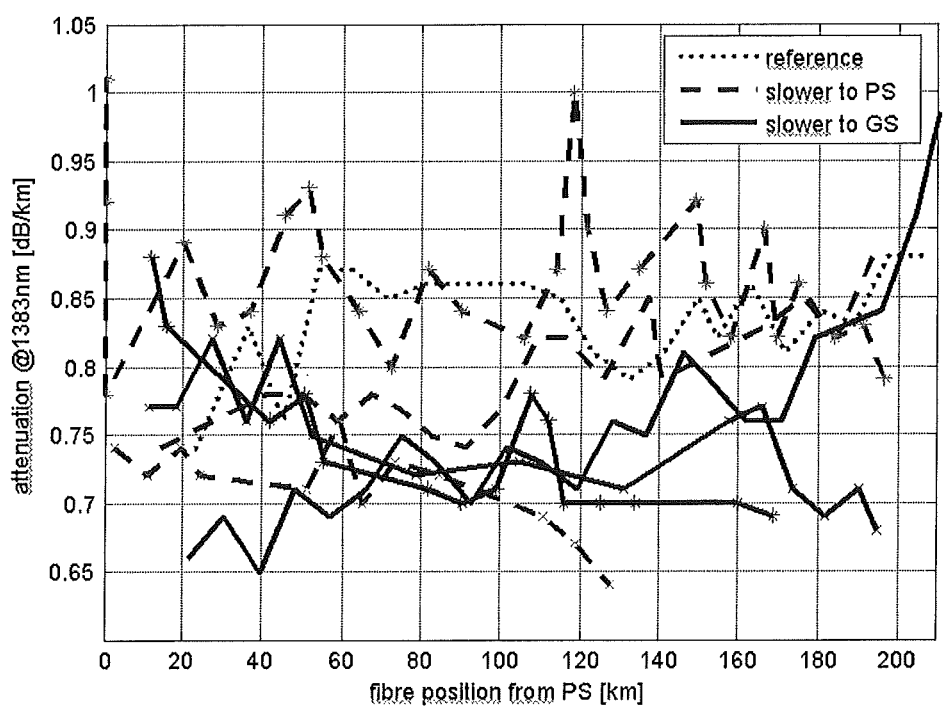
FIG. 2 shows the attenuation versus the fibre position according to an embodiment of the present invention.

Referring to FIG. 2, the preform manufactured according to the velocity profile of FIG. 1 was drawn into an optical fibre. The curves shown in FIG. 2 clearly demonstrate that the 1383 nm attenuation of the multimode fibres in which the velocity of the reaction zone is lower towards gas-side is substantially lower than the reference optical fibre. The reference optical fibre has been manufactured according to the prior art method in which the velocity of the reaction zone in both directions, i.e. from supply-side to pump-side and from pump-side to supply-side, is the same over the whole deposition process. In addition, FIG. 2 clearly demonstrates that the attenuation at a wavelength of 1383 nm of multimode fibres manufactured according to an inside deposition process of the PCVD type, in which the velocity of the reaction zone is lower towards the gas-side compared to the velocity towards the pump side, is lower than fibres manufactured with a lower velocity of the reaction zone towards to pump-side. The beneficial aspect of the present invention is that optical fibres having a reduced attenuation of about 10% to 20% can be obtained.

What is claimed is:

1. A method for manufacturing an optical preform via an internal vapor deposition process, wherein use is made of a reaction zone and a quartz glass substrate tube having a supply side and a discharge side, wherein the reaction zone is movable over the length of the substrate tube between a supply-side point of reversal and a discharge-side point of reversal, the method comprising the steps of:
    continuously supplying one or more glass-forming precursors by the internal vapor deposition process to the interior of the substrate tube at the supply side of the substrate tube such that deposition of glass layers continuously takes place on the interior of the substrate tube and components that have not been deposited on the interior of the substrate tube are discharged at the discharge side of the substrate tube, and
    setting a velocity of the reaction zone during the inside deposition process so that the velocity of the reaction zone over the length of the supply side-to-discharge side is higher than the velocity of the reaction zone over the length of the discharge side-to-supply side.

2. The method according to claim 1, wherein the velocity of the reaction zone over the length of the discharge side-to-supply side is no more than 70% of the velocity of the reaction zone over the length of the supply side-to-discharge side.

3. The method according to claim 1, wherein the velocity of the reaction zone over the length of the discharge side-to-supply side is no more than 50% of the velocity of the reaction zone over the length of the supply side-to-discharge side.

4. The method according to claim 1, wherein the velocity of the reaction zone over the length of the discharge side-to-supply side is no more than 30% of the velocity of the reaction zone over the length of the supply side-to-discharge side.

5. The method according to claim 1, wherein the velocity of the reaction zone over the length of the supply side-to-discharge side is within a range of 2 m/min to 40 m/min.

6. The method according to claim 1, wherein the velocity of the reaction zone over the length of the supply side-to-discharge side is within a range of 15 m/min to 25 m/min.

7. The method according to claim 1, wherein a power output of the reaction zone is constant over the length of the supply side-to-discharge side and the length of the discharge side-to-supply side.

8. The method according to claim 1, wherein during the inside deposition process the velocity profile of the length of the discharge side-to-supply side is changed as a function of the deposition time, wherein the initial velocity is higher than the final velocity.

9. The method according to claim 1, wherein the reaction zone comprises a plasma-generating resonator.

10. The method according to claim 1, further comprising the step of heating the optical perform obtained at one end and subsequently drawing an optical fibre therefrom.

11. The method according to claim 10, wherein an attenuation of the optical fibre thus obtained is less than 0.75 dB/km at a wavelength of 1383 nm.

* * * * *